United States Patent Office 3,669,553
Patented June 13, 1972

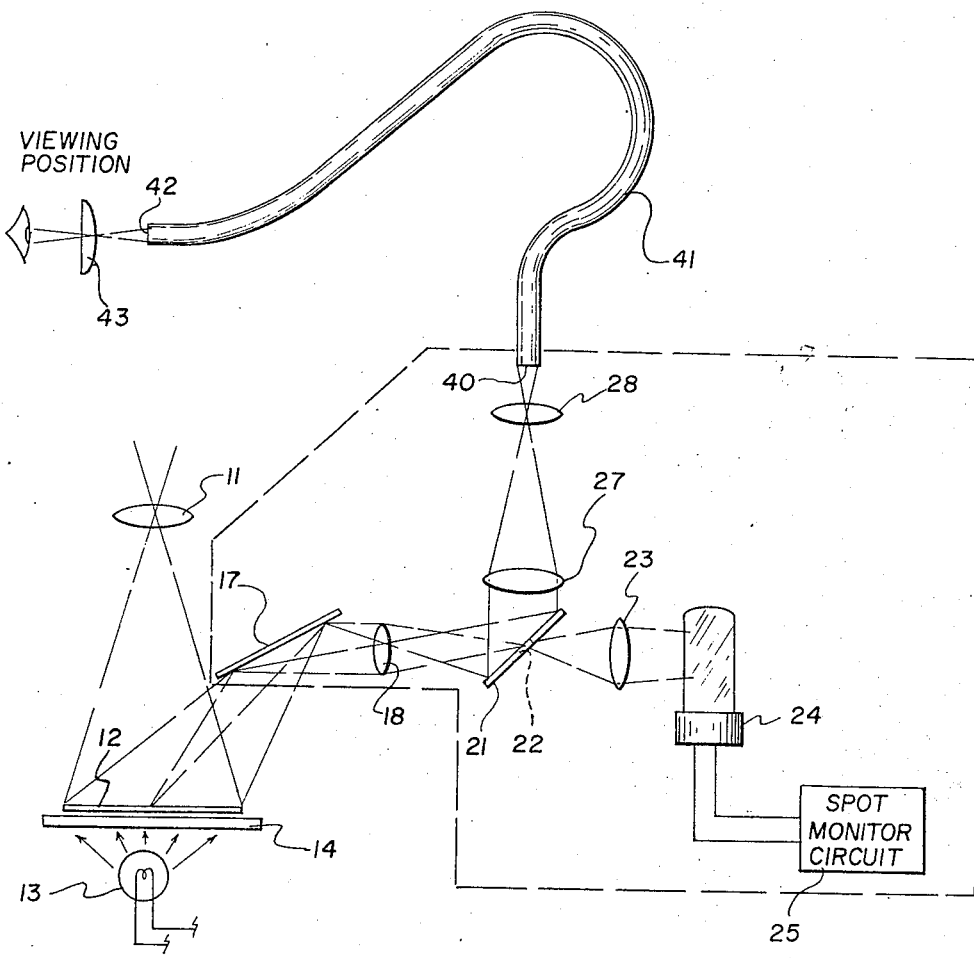

3,669,553
SPOT MONITOR AND VIEWING APPARATUS FOR FILM PRINTING
James E. Harvey, Rochester, N.Y., assignor to Eastman Kodak Company, Rochester, N.Y.
Filed Mar. 9, 1970, Ser. No. 17,814
Int. Cl. G01n 21/22
U.S. Cl. 356—202
4 Claims

ABSTRACT OF THE DISCLOSURE

A spot monitor system for use during film printing including a flexible fiber optic rod and a lens assembly to permit the operator to view the monitored portion of a film from a convenient location.

BACKGROUND OF THE INVENTION

Field of the invention

My invention relates to an optical monitor system and more particularly to spot monitoring apparatus for photographic film.

Description of the prior art

In making prints from photographic film it is the usual practice to monitor a selected area or spot on the film for controlling exposure and color balance. Spot monitoring involves measuring the optical density of the selected area to determine the optimum exposure parameters for a specific subject in the photographed scene without regard for the relatively unimportant background of the scene. Accordingly, the monitor spot must be moved with respect to the film so that the desired area of the film is being monitored, and means must be provided for the operator to determine where the spot is located on the film so that only the subject determines the exposure and color balance. This has been accomplished, for example, by a movable light source that illuminates a spot on the film so that the operator could see the portion of the film which was being spot monitored. Such methods have not been entirely satisfactory, because of insufficient contrast between the spot and the remaining film area which is illuminated by the printer composing light, and because the combined illumination from the spot monitor and the printer light source tends to reduce contrast within the spot being monitored.

SUMMARY OF THE INVENTION

Accordingly, it is an object of my invention to provide an improved spot monitor for use in photographic printing.

A more specific object of the invention is to provide a spot monitor system having improved contrast between the spot and the remaining film area.

A still further object of my invention is to provide an improved means for viewing film during spot monitoring.

These objects are accomplished according to a preferred embodiment of the invention by an optical system including an objective that forms an image of an object film on a primary image plane, means for dividing the field of the primary image into two unequal portions and means for directing the smaller portion of the divided image field to a monitor and for directing the remaining portion of the divided image field to a viewer. Preferably the field dividing means comprises reflecting means that intercepts light from only a portion of the image field. In the disclosed embodiment the field dividing means comprises a mirror having a transparent central portion. The mirror reflects the image to a viewer, so that an operator can see an image of the film object, except for the portion of the image field incident on the transparent portion of the mirror which appears as a dark spot on the viewed image. The spot portion of the image is transmitted to a monitor that can be used to control exposure parameters of the printer, such as color balance. Movement of this optical system results in a shifting of the spot location, so the desired area of the film can be monitored.

In accordance with the preferred embodiment of the invention, the viewer includes a bundle of flexible fiber optic rods that enable the operator to view the monitored film from a fixed location convenient to him as the position of the monitor spot is shifted.

BRIEF DESCRIPTION OF THE DRAWING

The drawing schematically shows a portion of a film printing apparatus and a monitor system according to the preferred embodiment of the invention.

DESCRIPTION OF THE PREFERRED EMBODIMENT

Referring now to the drawing there is shown schematically a portion of a film printer including a printing lens 11 for reproducing a film 12 transilluminated by a composing light source 13 through a diffuser 14.

A portion of the light from the film 12 is directed by a reflector 17 to an objective 18 which forms an image substantially in a primary image plane. A means for dividing the image field is located in or near the primary image plane in the form of a mirror 21 having a transparent central portion 22. Light incident on the transparent central portion 22 is transmitted through a collecting lens 23 onto a photocell 24, the output from which regulates the spot monitor circuit 25 which, in turn, can be used to control exposure parameters of the printer. Spot monitor circuits are known in the art, and further description is considered unnecessary. Preferably, adjustable supporting means (not shown) are provided for the photocell and other major elements of the monitor assembly.

Light reflected by the mirror 21 is transmitted through a field lens 27, positioned adjacent the mirror, to a relay lens 28 that reproduces the image in the primary image plane on the receiving end 40 of a coherent fiber optics bundle which may take the form of a plurality of fiber rods 41.

Element 41 is of a type of light conveying means well known in the art and functions to convey the light pattern applied to the receiving end 40 to its viewing end 42. The bundle 41 is flexible and of a suitable length to permit changing its contour as desired to accommodate position changes of the monitor assembly without changing the position of the viewing end.

A magnifier lens 43 is positioned at the viewing position adjacent to the viewing end of the optics bundle 41 and provides an enlarged image of the face 42 of the bundle. Accordingly, a printer operator is able to observe at his viewing position the film to be printed with a dark spot appearing on the area being monitored; that is, the operator sees through bundle 41 an image of film 12, except the portion of the image received by the photocell 24.

Since the flexibility of optics bundle 41 permits any required position shifting of the spot monitor and associated lens system without changing the viewing position of the operator, he is able to shift the position of the photocell 24 and associated equipment to locate the monitored spot on the principal subject of the film image. Thus, only the subject of the scene, and not the background, will determine the exposure control and color balance.

Many obvious advantages over prior spot monitoring systems are provided by the novel arrangement contemplated by the present invention. For example, the visibility of the film subject is improved since no additional illumination is required for the monitor, and the monitor system does not reduce contrast in the monitored area; the monitored spot is clearly identifiable as a dark spot to the operator; the viewing position can be located at a convenient location rather than at the film gate position of prior systems; and the flexibility of the light conveying bundle permits shifting the location of the monitoring equipment without changing the location of the viewing position.

The invention has been described in detail with particular reference to a preferred embodiment thereof, but it will be understood that variations and modifications can be effected within the spirit and scope of the invention.

I claim:

1. A monitor for measuring optical characteristics of a selected area of an object film for controlling exposure parameters in film printing, said monitor comprising:
   (a) an objective for forming an image of at least a portion of the object film in a primary image plane;
   (b) light responsive means;
   (c) optical viewing means; and
   (d) means for dividing the field of said image in said primary image plane into two non-overlapping regions, said dividing means including means for directing at least a portion of the light from one of said regions of the divided image field to said light responsive means for monitoring the optical characteristic of that region of the image field, said dividing means further including means for directing substantially all of the light of said second region of the image field to said optical viewing means whereby a viewer can see the total field of said image formed in said image plane with the selected area of the object film represented by a relatively dark spot.

2. Apparatus for monitoring optical characteristics of a selected area of an object film for controlling exposure parameters in film printing, said monitor apparatus comprising:
   (a) an objective for forming an image of at least a portion of the object film in a primary image plane;
   (b) a photodetector;
   (c) optical viewing means; and
   (d) means for dividing the field of said image in said primary image plane into two non-overlapping portions including a relatively small interior region and a larger outer region surrounding said interior region, said dividing means including means for directing at least a portion of the light from said interior region to said photodetector for monitoring the optical characteristics of said interior region of the image field, said dividing means further including means for directing substantially all of the light of said outer region of the image field to said optical viewing means whereby a viewer can see the total field of said image formed in said image plane with the selected area of the object film represented by a relatively dark spot.

3. Apparatus for monitoring optical characteristics of a selected area of an object film for controlling exposure parameters in film printing, said monitor apparatus comprising:
   (a) an objective for forming an image of at least a portion of the object film in a primary image plane;
   (b) a substantially flat mirror having a relatively small at least partially transparent central area, said mirror being mounted near and at an angle relative to said primary image plane wherein a portion of said central area is positioned substantially within said image plane so that the field of said image is divided into two non-overlapping portions consisting of a relatively small central region and a larger outer region surrounding said central region;
   (c) a photodetector for receiving light transmitted by said central area of said mirror to monitor the optical characteristics of said central region of the image field; and
   (d) optical viewing means for receiving light from said outer region of the divided image field so that a viewer can see the larger outer region of said image formed in said image plane with the selected area of the object film represented by a relatively dark spot.

4. Monitor apparatus as claimed in claim 3 wherein said viewing means includes a flexible coherent fiber optics bundle for permitting movement of the monitor apparatus relative to the viewer and the object film so that the total area of the object film can be monitored for determining the optical characteristics thereof without changing the position of the viewer and the object film.

References Cited

UNITED STATES PATENTS

| | | | |
|---|---|---|---|
| 3,186,295 | 6/1965 | Cuffey | 356—203 |
| 3,519,827 | 7/1970 | Chitayat | 350—136 |

WILLIAM L. SIKES, Primary Examiner

O. B. CHEW II, Assistant Examiner

U.S. Cl. X.R.

250—219 FR